Figure 1:
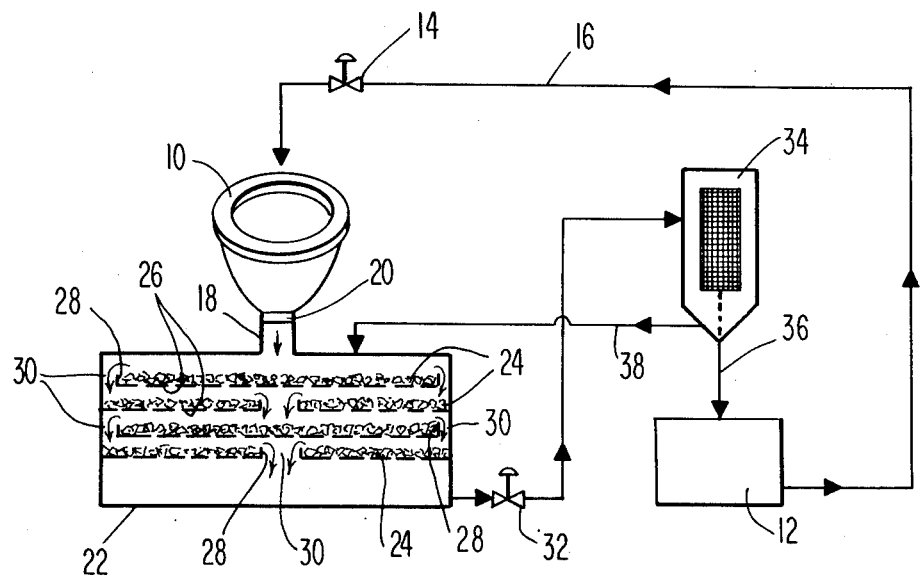

United States Patent [19]

Schmidt

[11] 4,014,767

[45] Mar. 29, 1977

[54] SELF-CONTAINED WASTE DISPOSAL SYSTEM INCLUDING SELF-CLEANING FILTER

[75] Inventor: Ferenc J. Schmidt, Ardmore, Pa.

[73] Assignee: Ametek, Inc., New York, N.Y.

[22] Filed: Oct. 18, 1974

[21] Appl. No.: 515,915

[52] U.S. Cl. .............................. 204/152; 204/151; 204/272

[51] Int. Cl.² .................... C02B 1/82; C25B 11/00

[58] Field of Search .......... 204/152, 149, 272, 276, 204/284, 151

[56] References Cited

UNITED STATES PATENTS

| 387,467 | 8/1888 | Webster | 204/152 |
|---|---|---|---|
| 565,491 | 8/1896 | Meyer | 204/152 |
| 673,452 | 5/1901 | Roberts | 204/151 |
| 821,360 | 5/1906 | Hinkson | 204/276 |
| 1,194,000 | 8/1916 | Dobyns et al. | 204/152 |
| 2,341,356 | 2/1944 | Briggs | 204/151 |
| 2,546,254 | 3/1951 | Briggs | 204/151 |
| 2,640,026 | 5/1953 | Whittington | 204/302 |
| 2,997,430 | 8/1961 | Foyn | 204/151 |
| 3,568,215 | 3/1971 | Riedel et al. | 204/149 |
| 3,647,672 | 3/1972 | Mehandjiev | 204/284 |
| 3,706,646 | 12/1972 | Gibson et al. | 204/149 |
| 3,718,556 | 2/1973 | Rohrback | 204/149 |
| 3,764,499 | 10/1973 | Okubo et al. | 204/151 |
| 3,793,178 | 2/1974 | Austin | 204/272 |
| 3,813,321 | 5/1974 | Bastacky | 204/149 |
| 3,816,293 | 6/1974 | Ueda et al. | 204/290 R |
| 3,819,504 | 6/1974 | Bennett | 204/289 |
| 3,871,989 | 3/1975 | King | 204/299 |

FOREIGN PATENTS OR APPLICATIONS 338,280  11/1914  Germany .................. 204/152

Primary Examiner—T. M. Tufariello
Attorney, Agent, or Firm—Miller & Prestia

[57] ABSTRACT

A self-contained toilet and waste treatment system comprises a toilet, a water flushing means, a waste treatment chamber including a comminuted redwood filter bed and digestion medium and a final filter, which treats the liquid effluent from the redwood filter and digestion medium, consisting of first and second porous sheet electrically conductive, generally metallic, elements spaced apart from one another and separated by a gas bubble impervious porous material. This filter also includes a means of imposing an electrical potential to establish an electrolytic current between the metallic elements. The first of the porous metallic elements through which the effluent passes acts as a filter member. A negative charge is established there and gaseous hydrogen is evolved, at a pressure on the order of 100 PSI. The evolving hydrogen gas bubbles displace semi-solid material from the metallic filtered element. Filtered material then settles and is removed, preferably for recycle to the redwood filter and digestion treatment chamber. Oxygen, and chlorine in the case of normal waste treatment, are evolved under the influence of the positively charged second metallic member. Filtered effluent, thus chlorinated and with residual solids therein oxidized, may then be recycled to the flushing means or discharged if so desired.

10 Claims, 2 Drawing Figures

SELF-CONTAINED WASTE DISPOSAL SYSTEM INCLUDING SELF-CLEANING FILTER

This invention pertains to a self-contained toilet and waste treatment system and particularly to such a system wherein the liquid effluent is sufficiently pure to permit its re-use as a flushing medium or discharge without polluting the environment and the waste digestion process is optimized for overall efficiency in the unit. This invention pertains also to a unique self-cleaning filter which is included in the system.

Self-contained waste disposal units are vitally important in providing ecologically and aesthetically acceptable waste disposal systems for self-contained housing units and transportation vehicles, such as mobile homes, trains, and boats. Heretofore, these systems, in some designs, have included a solid waste digestion chamber and filtering means. Typically, the efficiency of these units is limited and difficulties are encountered in clogging of the filter medium by the solid material in the liquid effluent, which tends to separate from the effluent as an impervious coating over the filter bed or filter surface.

Having in mind these problems, it is the general object of the present invention to provide a self-contained waste disposal system with more efficient waste digestion means and more effective effluent filtering means.

A more specific object of this invention is to provide such a system with a highly effective and efficient effluent filtration means which may be operated at high efficiency for extended periods of time, and which eliminates the bacteria in the effluent without addition of chlorine or other bactericidal chemicals.

Still another object of this invention is to provide an efficient and effective self-cleaning filter.

These and other objects, which will be apparent in the course of the following description, are met, briefly, by a self-contained toilet and waste treatment system comprising, in addition to the toilet, a flushing means and a waste treatment chamber, including comminuted redwood filter and digestion medium, and a final filter for treating the effluent of the digestion media. The final filter, which is itself a separate aspect of the present invention, comprises a pair of porous electrically conductive, generally metallic, elements spaced apart from one another and separated by a gas bubble impervious porous material, such as sand. The first of the sheet metallic elements through which the effluent passes acts as a filter. For that purpose, a fine mesh screen is preferred.

In a waste disposal system, as in the present invention, and in the filtering of other similar electrolytic liquids in which is suspended colloidal materials to be filtered therefrom, an electrolytic current is passed between the spaced apart metallic elements by the establishment of an electrical potential. Gas evolution at the filter element, hydrogen in the case of water as the electrolytic fluid to be filtered, displaces the non-charged filter cake material collecting on the filter element which would otherwise clog it in a short period of time, thus providing a self-cleaning filter. Since the colloidal particles in sewage and other organic materials are carriers of a naturally induced negative charge, such particles are repelled from the vicinity of the negative, hydrogen evolving, screen. Thereby, the filtration capability of the screen is considerably greater than warranted by the screen pore size alone.

In the waste treatment system of this invention, the hydrogen evolution also produces a relatively high pH which is conducive to flocculation and settling of the displaced sludge and colloidal material. In the preferred form of this invention, this collected and concentrated sludge material is returned to the redwood medium treatment chamber producing an activated sludge effect and enhancing the digestion efficiency of the chamber. At the second metallic element, oxygen and chlorine are evolved, producing an oxidizing, chlorinating and sterilizing effect tending to purify the water adjacent the second metallic element and neutralizing the pH. The effluent water may then be recycled to the flushing medium of the waste treatment system.

In the preferred form of the present invention, the waste treatment chamber comprises a plurality of vertically displaced horizontally disposed trays with overflow weirs and passageways on each of the trays such that the effluent passes through each of the trays and through redwood chips contained therein and overflows over weirs surrounding the passageways to the next lower tray, from which it passes through another opening, horizontally displaced from those above and below it, in a similar manner.

Also in the preferred form of the present invention, the final effluent filter consists of a cylindrical chamber with a conical bottom, in which the first and second metallic elements, consisting of metallic screens, are disposed in cylindrical form on a common axis, the second element being smaller in diameter than the first. Sand is disposed between the metallic elements and the first metallic element consists of a screen of 400 mesh or finer. Effluent enters the chamber near the outer walls of the chamber and passes inwardly through the first metallic element, wherein it is filtered, then through the inorganic, gas-impervious porous separator material, typically sand, and through the second metallic element and into a central collection chamber, from which it is returned to a reservoir for use in the flushing means.

Figure 2:
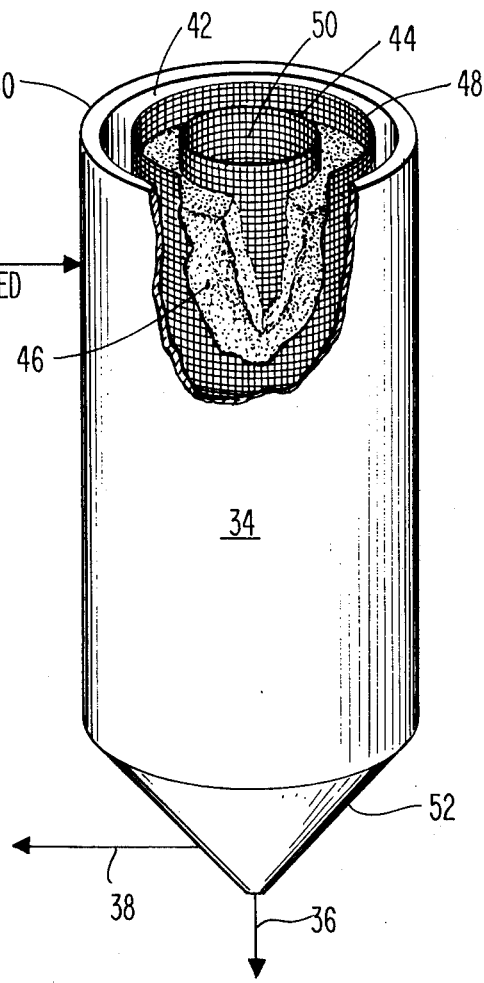

This invention may be better understood by reference to the following detailed description thereof, taken in conjunction with the appended claims and the accompanying drawings, in which:

FIG. 1 is a schematic illustration of the self-contained waste disposal system of the present invention; and FIG. 2 is a perspective view, partially cut away, of the unique self-cleaning filter of the present invention.

Referring more specifically to FIG. 1, there is shown a toilet 10, a flush reservoir 12, a flush valve 14, and a flush inlet line 16 comprising a water flushing means for toilet 10 and a toilet drain 18 with outlet valve 20 therein. In communication with toilet 10 through drain line 18 is a waste treatment chamber 22 housing a plurality of horizontally disposed vertically displaced perforated bottom trays 24, each having a bed of comminuted redwood or redwood chips 26 disposed thereon. Each tray 24 includes overflow weirs 28 adjacent downwardly opening passageways 30. Passageways 30 in vertically adjacent trays are horizontally displaced from one another so that liquid effluent introduced into a particular tray at first passes through the redwood chips and the perforated tray bottom, but once this passage clogs, it gradually overflows to a lower tray through which it passes first vertically and, after clogging, horizontally before overflowing that tray to the next succeeding tray. In effect, treatment chamber 22 comprises a trickle filter wherein comminuted redwood is used as a filter media. At the same time, the redwood filter media acts as a digestion medium in that waste and effluent passing through the trickle filter is subjected to the decaying action of bacteria causing digestion of the sludge therein and conversion of solid waste products to liquid effluent.

While other comminuted inorganic materials may serve as the trickle filter media and provide a multiplicity of sites for the bacterial digestive action in treatment chamber 22, redwood is preferred due to its resistance to deterioration.

Effluent passing though the bottom tray in treatment chamber 22 passes through filter feed control valve 32 and is pumped to the self-cleaning filter 34 of the present invention. From self-cleaning filter 34 pure filtered effluent passes through filter outlet line 36, either to an effluent outlet or, alternatively and preferably, to flush reservoir 12 for recirculation in the system as the flushing medium. Collected solids, actually a concentrated sludge material from filter 34, passes through sludge outlet line 38 back to treatment chamber 22 and particularly to the top most tray therein, wherein the bacterial activity in the filtered sludge from the effluent serves as an activator enhancing the digestive effectiveness of the bacteria in treatment trays 24 of treatment chamber 22 in a manner similar to activated sludge waste treatment processes often used in commercial sewage treatment plants. Thus, a more efficient and effective digestion process contributes to the overall effectiveness and efficiency of the self-contained toilet and waste treatment system of the present invention.

An important aspect of the efficiency and effectiveness of the self-contained waste treatment system of the present invention is the unique self-cleaning filter 34 which is seen in more detail in FIG. 2.

In FIG. 2, self-cleaning filter 34 is seen to consist of a cylindrical housing 40 surrounding an annular inlet space 42 into which the digested effluent feed from treatment chamber 22 is introduced. Inwardly of inlet space 42 is disposed a first porous electrically conductive, generally metallic, element 44, preferably a fine mesh metal screen of 400 mesh or finer, also referred to as filter element 44. A coated metal base screen and/or a metal coated screen may also serve as filter element 44. Adjacent filter element 44 is an electrically non-conductive (generally non-metallic and inorganic), gas bubble, impervious porous space material 46, such as sand. Inwardly of spacer material 46 is disposed a second porous sheet, electrically conductive, generally metallic, element 48, preferably also a metal screen or a coated screen in which either the base or the coating is metallic. A central effluent outlet space 50 is disposed at the axis of filter 34. At the bottom of housing 40 is a conical enclosure 52 in communication with inlet space 42 for collection of sludge material settling therefrom from which the settled solid material is removed from the filter through line 38. Central effluent collection space 50 communicates downwardly through conical enclosure 52 to permit removal of filtered effluent through outlet line 36.

Filter 34 also includes means, not shown, for imposing an electrical potential between metallic elements 44 and 48, more particularly passing an electrolytic current therebetween, with the first or outer metallic element, the filter element 44, having a negative charge and acting as a cathode and the second, inner element 48, having a positive charge and acting as the anode.

In the preferred mode of the operation of filter 34, an electrical potential of 5–30 volts, preferably about 10 volts, is imposed between a filter element 44, consisting of 400 mesh stainless steel screen, and second metallic elements 48, a screen consisting of a lead oxide coated titanium base, to produce hydrogen evolution at filter element 44 and oxygen and chlorine evolution at inner element 48. Hydrogen evolving at filter element 44, at an effective pressure of about 100 PSI, tends to dislodge the solid or semi-solid filtered material collecting on filter element 44, and induces flocculation which causes these separated suspended solids to settle to the bottom of enclosure 40. This settling action is enhanced by the increased pH brought about by the hydrogen evolution in that inlet space 42 of filter 34, and by repulsion of fine natural colloids from the negatively charged screen.

Along with oxygen, chlorine, present in the system from urine, is evolved at the inner or second metallic element 48. The combined effect of the evolution of these gases is to oxidize any remaining color bodies and solid materials in the filtered liquid effluent and also to chlorinate the solution; this chlorination, together with the bactericidal effect of the electrolytic current, eliminates bacterial activity. Further, evolution of these gases tends to lower the pH of the filtered effluent back to near 7 or neutral. Thus, the filtered, chlorinated, oxidized liquid effluent is ideally suited for re-use in the flushing medium of the self-contained waste treatment system of this invention.

In general, the second or inner, metallic or electrically conductive, element 48 may comprise any material combination useful as an anode in the electrolytic production of chlorine. The material used, of course must be electrically conductive and resistant to attack by chlorine and oxygen. Typical of the materials which may be used are carbon, lead dioxide, and precious metals and their oxides or coatings of these materials on supporting substrates. Similarly titanium or tantalum may be used as the base material, although a non-passivating coating, such as platinum or lead dioxide, is preferred in combination with such metals.

It should be noted that the self-cleaning filter of the present invention may find use in application outside of the waste treatment field, particularly where such applications involve the filtration of an electrolytic fluid either to settle, concentrate or remove from solution difficulty separable fine solids or to clarify the liquid in which the solids are suspended. Concentrating the colloidal solids for removal or reclamation from waste sugar or potatoe processing solutions and clarifying the effluent from winery wastes, sometimes known as "still slops," are but a few of the possible applications of the self-cleaning filter of this invention.

In a prototype waste disposal system, designed and built in accordance with the present invention, outer metallic element or filter element 44 consists of approximately one square foot of 400 mesh stainless steel screen. Inner element 48 consists of $PbO_2$-coated titanium screen. The effluent is passed through the filter at a rate of approximately 3 liters per hour. An electrolytic current of 4 amps is established between the m.- tallic filter elements with a 10 volt potential applied either continuously or for 30 second intervals every ten minutes. With no electrolytic current or voltages established, the filter screen clogs in approximately twenty minutes. Even after clogging, however, flow can be restarted easily with the application of current and the subsequent dislodging of collected solids on the filter member by the hydrogen liberated there. At these treatment rates and conditions, decolorization and disinfection of the filtered effluent is highly effective. Faster flow rates and lower current are useful in providing a self-cleaning filter if less decolorization and disinfection is tolerable in the system.

As an example of the outstanding results obtainable in the self-contained waste treatment system of this invention, a system including the filter described in the foregoing paragraph, operated at 10 volts and 4 amps, in combination with a redwood chip trickle filter chamber, as described above, has been tested for treatment effectiveness on typical human waste sewage with the following results as shown in the Table:

TABLE

| Raw Sewage to Trickle Filter | | Trickle Filter Effluent to Final Filter | Effluent from Final Filter | |
|---|---|---|---|---|
| Biological Oxygen Demand | 6300 ppm* | 700 ppm | 10 ppm | |
| Chemical Oxygen Demand | 14,200 ppm | 2100 ppm | 21 ppm | All within current EPA standards for discharge to natural waterways |
| Coliform (most probable number per 100 ml) | >100,000,000 | 1,000,000 | 0 | |
| Color | Brown | Brown | None | |
| Suspended Solids | Not Tested | 990 ppm | 13 ppm | |
| Odor | Not Tested | Not Tested | None | |

*parts per million

While this invention has been described with respect to specific embodiments and examples, it should be understood that this invention is not limited to these embodiments. The appended claims are intended to be construed to encompass all forms of the invention, including variations and modifications which may be made by those skilled in the art without departing from its true spirit and scope.

I claim:

1. In a self-contained toilet and waste treatment system consisting of a toilet, a water flushing means and a waste treatment chamber comprising a comminuted redwood waste filter and digestion medium, the improvement comprising a final filter for further filtering the liquid effluent from said waste treatment chamber, said final filter consisting of first and second porous sheet electrically conductive elements spaced apart from one another with a gas bubble impervious porous non-metallic spacer material between said elements, housing and channeling means for causing an electrolytic liquid to be filtered to flow successively through said first conductive element, said porous non-metallic spacer material and said second conductive element, and means for causing an electrolytic current to flow between said elements with said first element as cathode and said second element as anode and thereby causing gas bubbles to be generated to be generated at said first element.

2. An improved waste treatment system, as recited in claim 1, wherein said electrically conductive elements are cylindrical conductive screens, of different diameters, on a common axis.

3. An improved waste treatment system, as recited in claim 2, wherein said first element is a 400 mesh or finer metallic screen, which surrounds said second element, said housing and channeling means comprising an enclosure surrounding said first element and means for introducing said liquid effluent into a space between said housing and said first element, means at the bottom of said housing for collecting semi-solid material filtered from said effluent by said first element, and means for removing from said filter, filtrate passing through said second element.

4. An improved waste treatment system, as recited in claim 1, wherein said electrolytic current is maintained by a potential of 5–30 volts impressed on said elements.

5. An improved waste treatment system, as recited in claim 3, wherein said electrolytic current is maintained by a potential of 5–30 volts impressed on said elements.

6. An improved waste treatment system, as recited in claim 1, wherein said electrolytic current is maintained by a potential of about 10 volts impressed on said elements.

7. An improved waste treatment system, as recited in claim 1, including means for returning semi-solid material filtered from said effluent by said first metallic element to said waste treatment chamber.

8. An improved waste treatment system, as recited in claim 1, including means for returning filtrate passing through said second element to a reservoir for subsequent use by said flushing means.

9. An improved waste treatment system, as recited in claim 1, wherein said treatment chamber comprises a plurality of layers of horizontally disposed perforated trays of redwood chips, each of said trays including overflow weirs and adjacent openings for gravity passage of overflowing effluent to the next succeeding tray layer, said openings in vertically adjacent trays being horizontally displaced from one another.

10. An improved waste treatment system, as recited in claim 9, including means for returning semi-solid waste material filtered from said effluent by said first element to the top most tray in said treatment chamber.

* * * * *